E. H. LICHTENBERG.
CLUTCH AND BRAKE CONTROL MECHANISM.
APPLICATION FILED SEPT. 10, 1916.

1,328,635. Patented Jan. 20, 1920.

Witness
H. Wagner

Inventor
E. H. Lichtenberg
Robert Roth
Attorney

E. H. LICHTENBERG.
CLUTCH AND BRAKE CONTROL MECHANISM.
APPLICATION FILED SEPT. 18, 1916.
1,328,635.
Patented Jan. 20, 1920
2 SHEETS—SHEET 2.
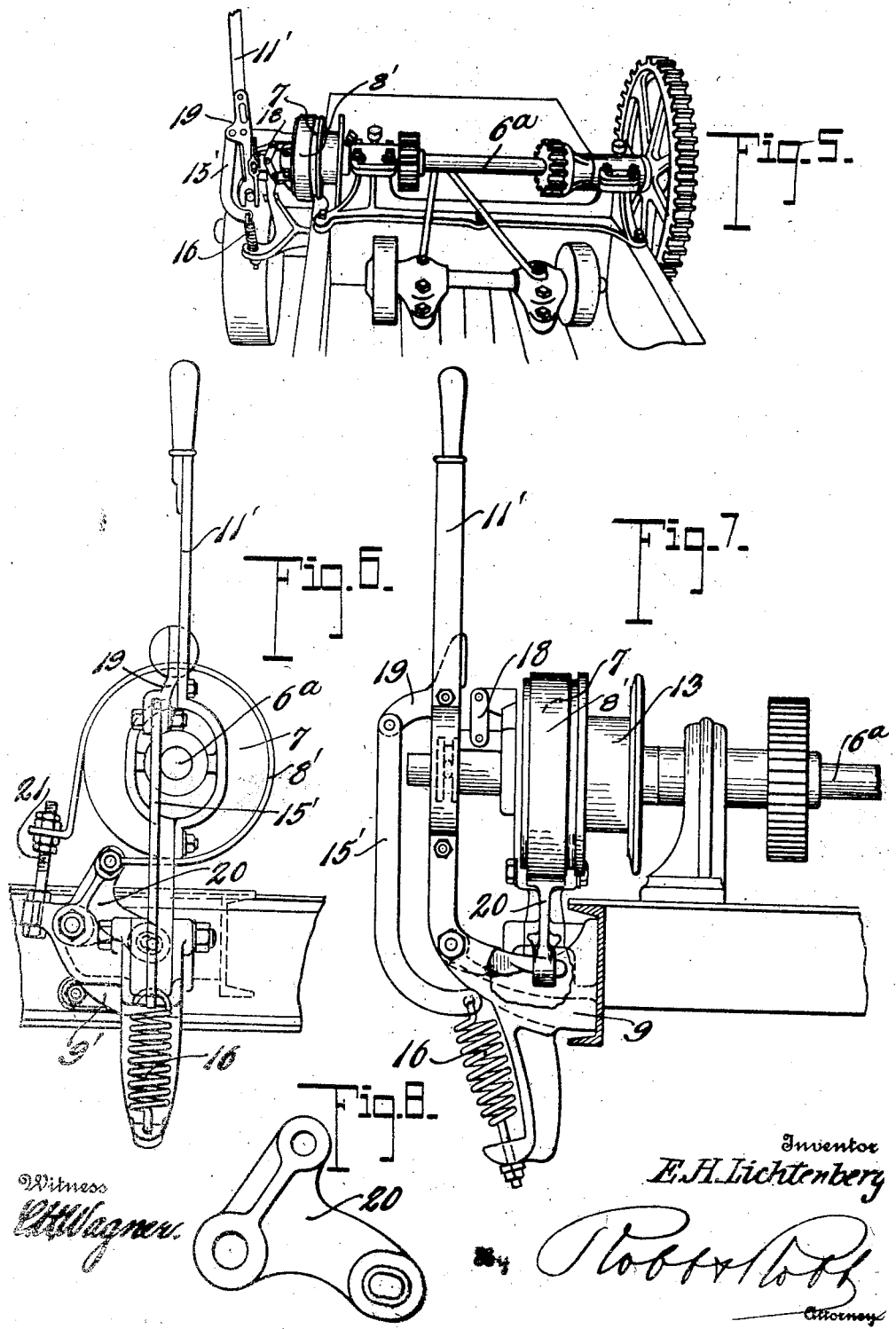

UNITED STATES PATENT OFFICE.

ERICH H. LICHTENBERG, OF MILWAUKEE, WISCONSIN, ASSIGNOR TO KOEHRING MACHINE COMPANY, OF MILWAUKEE, WISCONSIN.

CLUTCH AND BRAKE CONTROL MECHANISM.

1,328,635.

Specification of Letters Patent. Patented Jan. 20, 1920.

Application filed September 18, 1916. Serial No. 120,744.

*To all whom it may concern:*

Be it known that I, ERICH H. LICHTENBERG, a citizen of the United States, residing at Milwaukee, in the county of Milwaukee and State of Wisconsin, have invented certain new and useful Improvements in Clutch and Brake Control Mechanism, of which the following is a specification.

This invention appertains to loading devices of the general type which is commonly employed to-day in association with mixing machines. Such loading devices comprise ordinarily a loading skip or bucket adapted when in a position lowered to the ground level to receive the materials to be mixed, suitable hoisting means being connected with the skip or bucket whereby to raise the same into an upwardly and downwardly discharging position.

The present invention has to do primarily with the means for controlling the raising and lowering of a loading device of the class just described. Usually a drive shaft is utilized as the driving member connected with the hoisting means or cables attached to the skip whereby to raise the latter and subsequently to lower it to its ground level position. It is customary to provide in connection with the said driving member a manually operable clutch mechanism adapted to connect a cable winding drum to the driving member when it is desired to raise the skip; also it is customary to utilize separate manually controllable brake mechanism adapted to be applied as soon as the drive by which the skip is raised is discontinued, said brake mechanism acting to permit relatively slow downward or dropping movement of the skip to its ground level position.

The present invention involves the provision of a combination clutch and brake control mechanism intended to be used in lieu of the separate brake and clutch control mechanisms heretofore employed. According to the present improvements therefore, I utilize a single control lever or member connected with clutch devices whereby movement of said lever in a predetermined direction establishes the necessary drive from the driving member or shaft by which the loading skip aforesaid is adapted to be raised, said control lever or member being likewise connected with a brake device so that movement of said control member in another predetermined direction is effective to apply the brake. The control member is adapted to be positioned in a neutral position, so to speak, whereby neither the clutch mechanism or brake device associated therewith is operated.

My invention also involves certain peculiar means whereby automatic operation of the said control mechanism for the clutch and brake devices may take place, and furthermore I utilize peculiar means adapted to act automatically to hold the control lever or member in either brake applying or clutch operating positions.

My invention also resides in other details of construction which will appear more fully as this description proceeds.

In the accompanying drawings:—

Fig. 5 is a modified adaptation of the invention.

Figs. 6 and 7 are views similar to Figs. 3 and 2 respectively, showing a modified arrangement of control parts.

Fig. 8 is a detail view of the brake band operating lever used in the modified adaptation of the invention.

Figure 1:
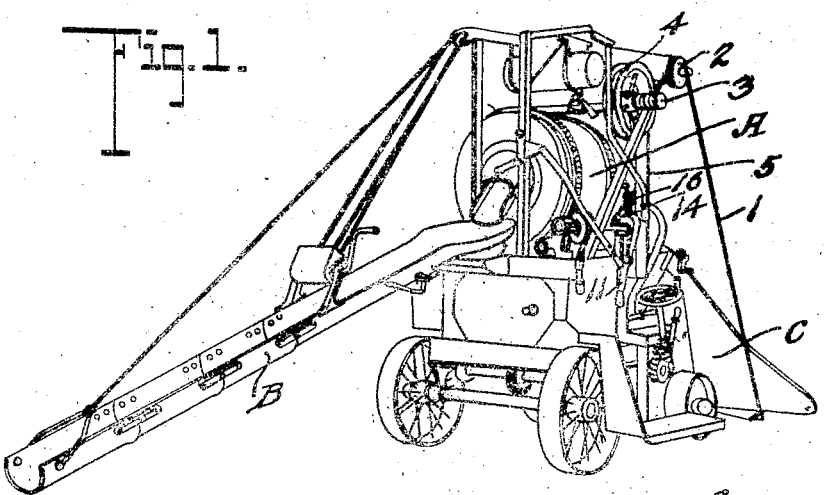
Figure 1 is a view showing in general outline a high drum paving mixer with a loading skip applied thereto, and illustrating control mechanism in accordance with the invention.

In Fig. 1 the mixing machine illustrated is of a conventional type employing the mixing drum A, the distributing chute B, and the loading skip C. The loading skip C is adapted to be raised and lowered through the instrumentality of one or more cable connections 1 attached at one end to the skip and passing over a pulley or pulleys 2 on the framework of the machine, after which said cable or cables lead to a drum or drums 3 on a suitable shaft carrying a large drum 4. About drum 4 winds a cable 5 leading to a drum upon a shaft 6, see Fig. 2, the equivalent of said shaft 6 being designated 6ª in Figs. 5 to 7. It suffices to state that the shaft 6 or 6ª, as the case may be, is a driving shaft adapted to cause winding up of a cable or any similar driving action whereby the skip C may be raised into an inclined position discharging into the mixing drum A, after which the skip may be lowered by a braking action in respect to the shaft 6 on which will be provided a suitable brake drum 7.

It is not material to the present invention whether the same be used in connection with a driving member or shaft 6 or 6ª which is adapted to raise and lower a loading skip, since it will be obvious that a control mechanism of the type of the invention is susceptible of coöperation with a driving member, like or equivalent to the shaft 6, and which is adapted to perform any similar work to that of the raising and lowering of a skip constituting a load which the driving member is adapted to handle.

Figures 2, 3:
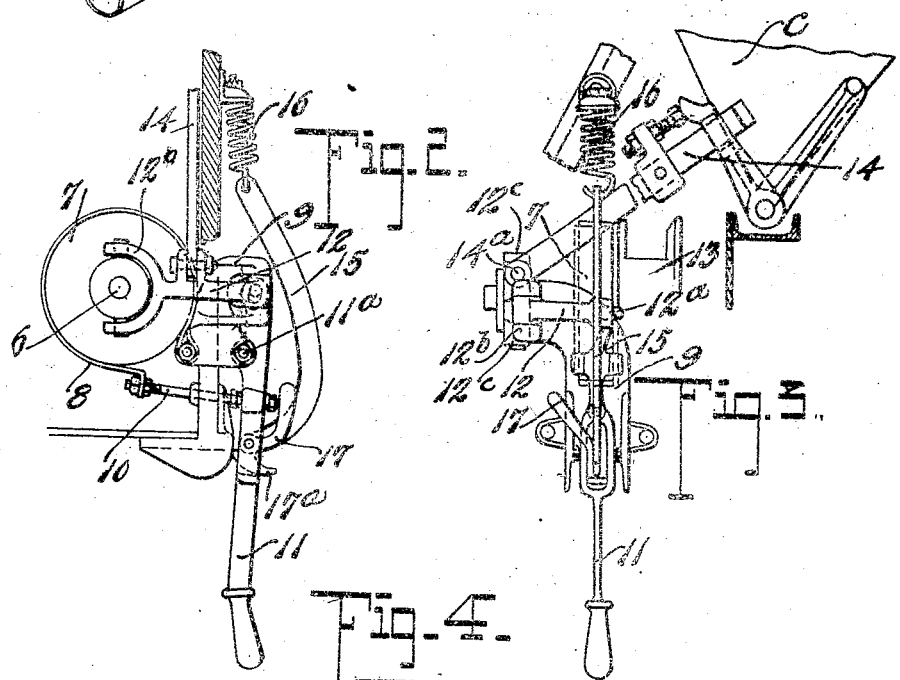
Fig. 2 is a sectional view illustrating in side elevation the various parts of the control mechanism.
Fig. 3 is a front elevation of the control mechanism parts as viewed when the mixing machine is seen in side elevation, the loading skip being broken away but illustrated in its upward position as when acting on the knock-out parts for the clutch mechanism.
Figure 4:
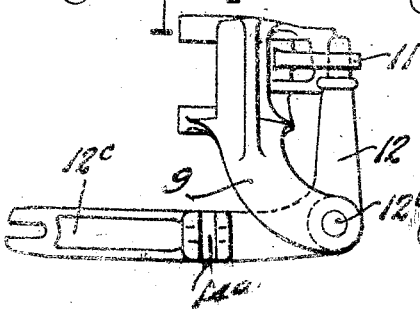
Fig. 4 is a detail view of the clutch operating lever used in the construction illustrated in Figs. 1 to 3 inclusive.

Referring particularly to Figs. 2 and 3, it will be observed that the brake wheel 7 has a brake band 8 passing therearound, one end of said band being attached to a bracket 9 secured to the framework of the machine, the opposite end of the band being secured by a bolt 10 to the main operating lever 11. The operating lever 11 is pivoted to the bracket 9 at 11ª and at its lower end the lever 11 has a handle while at its upper end the lever is formed with a slot adapted to receive the reduced end portion 12ª of a clutch operating lever 12. The lever 12 is also pivoted to the bracket 9, at the point 12ᵇ, one arm of the lever 12 engaging in the slot of the lever 11 as previously suggested and the other arm of the lever 12 being formed with the clutch operating hook 12ᶜ adapted to shift suitable clutch devices on the shaft 6 into engagement with the side of the brake wheel 7 which wheel with the connected winding drum 13 is loose on the shaft 6. Through the action of the clutch devices operated by the clutch arm of the lever 12 the shaft 6 is adapted to be operatively connected with the parts 7 and 13 so as to drive the drum 13 in a direction to wind thereon the cable 5, and thus cause raising movement of the loading skip C. When the skip C has reached its uppermost position the inner pivotal portion of the skip actuates a knockout bar 14 which knock-out bar is connected at its lower end pivotally at 14ª with the clutch lever 12, in such a manner as to shift the clutch lever to disengage the clutch devices from the brake wheel 7.

There is provided in association with the main lever 11 a curved link 15 one end of which is attached pivotally to the lever 11 between the handle of the lever and the point of pivotal support 11ª. The other end of the link 15 is secured to a coiled spring 16 and the point of attachment of the link to said coil spring is such that by movement of the lever 11 the point of pivotal connection between the link 15 and the lever may be shifted to opposite sides of a plane intersecting the point of pivotal support of the lever 11 and the point of its connection with the spring 16. In other words, more simply expressed, the point of connection of the link 15 with the lever 11 can be moved on opposite sides of a dead center, that is adapted to be established by alinement of the point of connection of the lever 11 with the bracket 9, and the point of attachment of the link 15 and spring 16.

The general mechanism above described operates as follows: When the user of the machine desires to raise the skip C the lever 11 is pushed into substantially the position shown in Fig. 2 until the point of connection of the link 15 and the lever 11 is at the left side of the dead center position previously referred to. The result of the foregoing action is that the spring 16 acts on the lever 11 through the link 15, to hold the lever 11 in the position stated. The moving of the lever 11 to the position mentioned creates a looseness of the brake band 8 in respect to the brake wheel 7 and simultaneously rocks the horizontal clutch lever 12 so as to cause engagement of the clutch devices actuated by said lever with the brake wheel, thereby establishing an operative connection between the shaft 6 which is constantly driven, and the parts 7 and 13 loose thereon. The cable 5 is now wound upon the drum 13 causing the winding of the skip hoisting cables 1 about the drum or drums 3, two of which are usually provided.

Once the lever 11 is moved to the position mentioned, the operator can release his hold upon the lever because of the action of the spring 16 thereon. When the skip C reaches its dumping or discharging position it automatically actuates the knock-out bar 14 so as to shift the clutch lever 12 and disengage the clutch devices thereof from the brake wheel 7. The shifting of the clutch lever 12 in this manner forces the upper end of the main lever 11 inward toward the bracket 9, tilting said lever 11 so that its outer end is carried to the right of the dead center position described above, the spring 16 automatically acting instantly to hold the lever 11 in its new position as well as to exert an outward pull on said lever sufficient to cause the brake band 8 to take firmly in engagement with the brake wheel 7 and thereby the skip C is stopped and held in charging position until released.

To release and lower the skip the operator has to grasp the handle of the lever 11 and force the same toward the bracket 9 to relieve the pull on the brake band 8 as much as desired, the skip C being adapted to be lowered slowly or fast depending upon the amount of pressure exerted on the lever 11 for the purpose stated.

Under certain conditions it is desirable once the skip C has been raised that it be permanently held in its raised position for the time being. For this purpose I provide a locking cam lever 17 pivoted to the main lever 11 and having a cam 17ª adapted to be swung into impinging engagement with the frame of the machine so as to positively hold the lever 11 in the position thereof required to maintain the brake band 8 firmly engaged with the brake wheel 7. When so positioned the locking lever 17 prevents liability of accidental lowering of the skip C once raised, and the device 17 is especially advantageous when it is wished to maintain the skip in elevated position as during a period of transportation of the mixing machine, or non-use of the machine; also the part 17 prevents untimely engagement of the clutch.

Passing now to the modified adaptation of the invention illustrated by Figs. 5 to 8 inclusive, it is deemed unnecessary to describe the various parts specifically since the construction and operation of this mechanism may be set forth and will be understood readily in view of the explanation of the first described construction. In Figs. 5 to 7 there will be seen one or more of the elements of the driving member or shaft 6ª, the winding drum 13, the brake wheel 7, the brake band 8', the clutch devices 18 for connecting the shaft 6ª with the parts 7 and 13, the main lever 11', the link 15' connecting with an offstanding arm 19 secured to the main lever 11', the spring 16 attached to the link 15'. The main lever 11' has its lower end extended laterally and engaged in a slot in an arm of the brake band actuating lever 20, the latter being pivoted to a bracket 9' on the frame of the machine and having its other end connected with an end of the brake band 8', the opposite end of the brake band 8' being secured by a bolt 21 to the bracket 9'.

It may be noted that the main lever 11' in the modified construction is directly engaged with the lever which actuates the brake band in this instance instead of being directly engaged with a lever which actuates the clutch devices as in the first described adaptation of the invention. Likewise in the modified adaptation the lever 11' in carrying out the reversed arrangement, so to speak, has a yoke directly connecting with the clutch devices 18, whereas in the first described construction said lever was directly connected with the brake band intermediate its ends.

The functioning of the various parts is practically the same in the modification as is the first described construction, however, the spring 16 acting in both instances to hold the lever 11' in either its clutch engaging or its brake band operating positions. Movement of the lever 11' rearwardly toward the part 7 engages the clutch devices 18 with the brake wheel 7 and relieves the brake band from braking engagement with the wheel 7 through downward timing of the lever 20. The outward movement of the lever 11' causes a reverse action, namely a release of the clutch devices and an application of the brake mechanism.

It is of course to be understood that the main operating lever 11 or 11' is common to the clutch and brake devices and is broadly speaking a main control member. Likewise the shaft 6 or 6ª, as the case may be, is a driving member adapted to handle the load whatever it may be, under the control of the main control member.

Having thus described the invention, what is claimed as new is:—

1. In control mechanism of the class described, the combination, of a driving member, control means therefor comprising a clutch for connecting said driving member with the work, a brake governing the action of said driving member, a main control member, operating connections intermediate said control member and the brake and clutch, and a spring so connected with said main control member as to automatically act thereon to hold it in its brake applying or clutch controlling positions.

2. In control mechanism of the class described, the combination, of a driving member, control means therefor comprising a clutch for connecting said driving member with the work, a brake governing the action of said driving member, a main control member, operating connections intermediate said control member and the brake and clutch, and a single means effective automatically for holding the control member in brake applying or clutch controlling positions and separate means to positively lock the control member in one of said positions.

3. In control mechanism of the class described, the combination, of a driving member, control means therefor comprising a clutch for connecting said driving member with the work, a brake governing the action of said driving member, a main control member, operating connections intermediate said control member and the brake and clutch, and a spring so connected with said main control member as to automatically act thereon to hold it in its brake applying or clutch controlling positions once the said control member is moved to either of such positions.

4. In control mechanism of the class described, the combination, of a driving member, control means therefor comprising a 1,328,635 clutch for connecting said driving member with the work, a brake governing the action of said driving member, a main control member, operating connections intermediate said control member and the brake and clutch, a pivotal support for the control member, a spring, a link connected at one end with said spring and at its other end with said control member, the points of connection of said link with the spring and control member being located on opposite sides of the pivotal support of the control member whereby the control member may be shifted into brake applying or clutch applying positions and the said spring will automatically act to hold said member in either of such positions once assumed thereby.

5. In control mechanism of the class described, the combination of a driving member, a clutch for connecting said member with the work, a brake to act upon said member when the clutch is released, a main operating lever, connections intermediate said lever and the brake, and connections intermediate said lever and the clutch so arranged that when the brake is applied the clutch may be released and when the clutch is effective the brake may be ineffective, a pivotal support for said lever, and means to hold the lever in either of its positions above stated consisting of a link connected with the lever at one side of its pivotal support, a spring connected with the link at the other side of the pivotal support of the lever, the point of pivotal connection of the link with the lever being shiftable to opposite sides of the dead center line established by a plane intersecting the point of attachment of the spring and link and the point of pivotal support of the lever, whereby the spring may act to hold the lever in either clutch applying or brake applying positions.

6. A lever control mechanism comprising a main control lever, a support, a pivotal connection between said lever and said support, devices adapted to be operated by said lever, and means for holding the lever in either of two operating positions consisting of a spring, a link attached at one end to said spring with the point of attachment at one side of the pivotal support of the lever, and a connection between said link and the lever located at the other side of the pivotal support, one of the link or lever parts being arched whereby the point of pivotal connection between the link and lever may be shifted to opposite sides of a dead center line established by a plane intersecting the point of pivotal support of the lever, the point of attachment of the lever with the spring and the point of connection of the link with the lever.

7. In control mechanism of the class described, the combination of a driving member, a clutch for connecting said member with the work, a brake to act upon said member when the clutch is released, a main operating lever, connections intermediate said lever and the brake, and connections intermediate said lever and the clutch so arranged that when the brake is applied the clutch may be released and when the clutch is effective the brake may be ineffective, a pivotal support for said lever, and means to hold the lever in either of its positions above stated consisting of a link connected with the lever at one side of its pivotal support, a spring connected with the link at the other side of the pivotal support of the lever, the point of pivotal connection of the link with the lever being shiftable to opposite sides of the dead center line established by a plane intersecting the point of attachment of the spring and link and the point of pivotal support of the lever, whereby the spring may act to hold the lever in either clutch applying or brake applying positions, and a locking member coöperating with said lever to lock the same positively in a position maintaining the brake applied.

8. In controlling mechanism of the class described, the combination of a driving member, clutch and brake parts for respectively connecting the driving member with the work and governing the action of said driving member, a main control lever operatively connected with said parts for controlling the same so that they may be alternatively effective, and means adapted to be operated by said driving member to shift the main control lever and render inactive one of said parts which may be effective under the control of the lever.

9. In control mechanism of the class described, the combination of a driving member, clutch and brake parts for respectively connecting the driving member with the work and governing the action of said driving member, a main control lever operatively connected with one of said last named parts for direct operation of the same, a secondary lever connected with the other of said clutch and brake parts, and also connected with said main control lever, and means adapted to be operated by the driving member and connected with the secondary lever for shifting said lever to thereby actuate the main control lever so as to affect the operation of the clutch and brake parts.

10. In control mechanism of the class described, the combination of a driving member, clutch and brake parts for respectively connecting the driving member with the work and governing the action of said driving member, a main control lever operatively connected with one of said last named parts for direct operation of the same, a secondary lever connected with the other of said clutch and brake parts, and also connected with said main control lever, a knock-out bar connected with the secondary lever, and means adapted to be operated by the driving member for shifting said knock-out bar and thereby rocking the secondary lever in such a manner as to actuate the main control lever so as to affect the action of the clutch and brake parts.

11. In control mechanism of the class described, the combination of a driving member, clutch and brake parts for respectively connecting the driving member with the work and governing the action of said driving member, a main control lever operatively connected with one of said last named parts for direct operation of the same, a secondary lever connected with the other of said clutch and brake parts, and also connected with said main control lever, a knock-out bar connected with the secondary lever, means adapted to be operated by the driving member for shifting said knock-out bar and thereby rocking the secondary lever in such a manner as to actuate the main control lever so as to affect the action of the clutch and brake parts, and means automatically operable as an incident to the action of the knock-out bar to hold the main control lever in the position assumed thereby under the action of the secondary lever.

12. In control mechanism of the class described, the combination of a driving member, clutch and brake parts for respectively connecting the driving member with the work and governing the action of said driving member, a main control lever operatively connected with one of said last named parts for direct operation of the same, a secondary lever connected with the other of said clutch and brake parts, and also connected with said main control lever, a knock-out bar connected with the secondary lever, means adapted to be operated by the driving member for shifting said knock-out bar and thereby rocking the secondary lever in such a manner as to actuate the main control lever so as to affect the action of the clutch and brake parts, and spring means automatically operable as an incident to the action of the knock-out bar to hold the main control lever in the position assumed thereby under the action of the secondary lever, said spring means being likewise adapted to hold both the secondary and main control levers in the positions in which they are disposed previous to the action thereon of the knock-out bar.

In testimony whereof I affix my signature.

ERICH H. LICHTENBERG.